No. 856,068. PATENTED JUNE 4, 1907.
J. JUHÁSZ.
APPARATUS FOR TEACHING AND LEARNING ARITHMETIC.
APPLICATION FILED MAY 25, 1906.
2 SHEETS—SHEET 1.
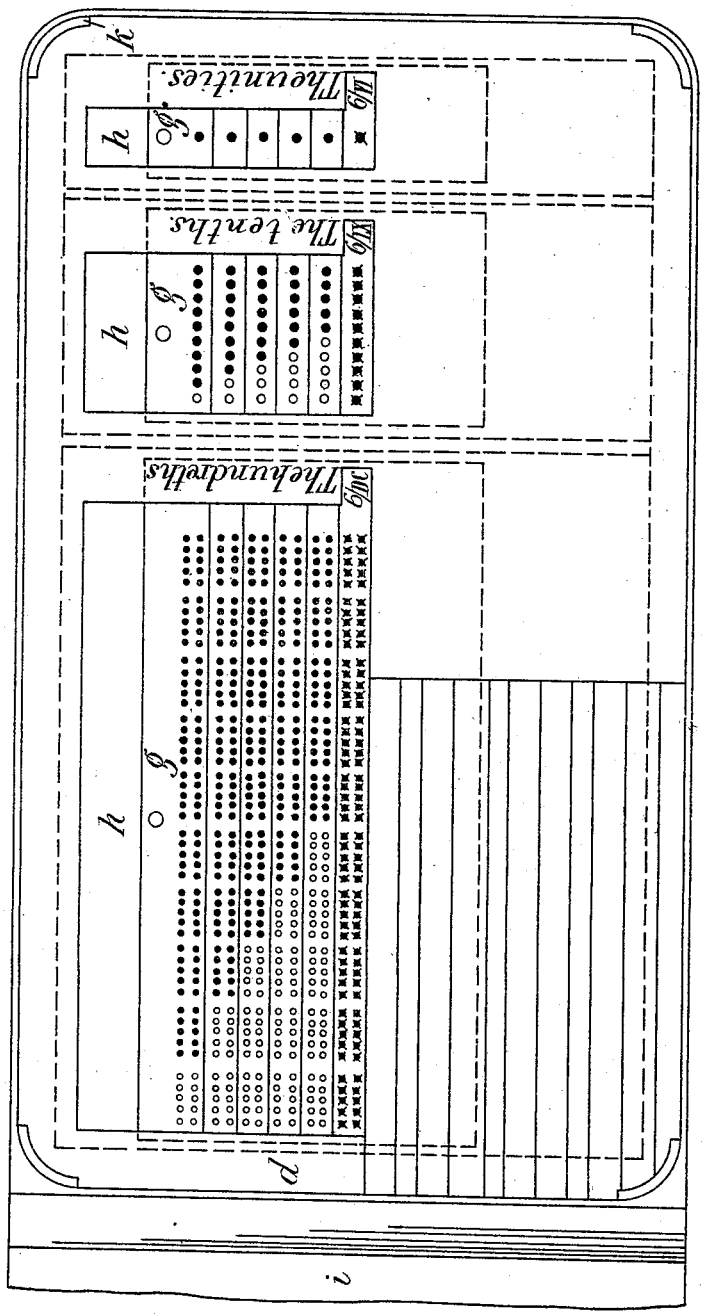
Witnesses:
Inventor:
Josef Juhász No. 856,068.
PATENTED JUNE 4, 1907.
J. JUHÁSZ.
APPARATUS FOR TEACHING AND LEARNING ARITHMETIC.
APPLICATION FILED MAY 25, 1906.
2 SHEETS—SHEET 2.
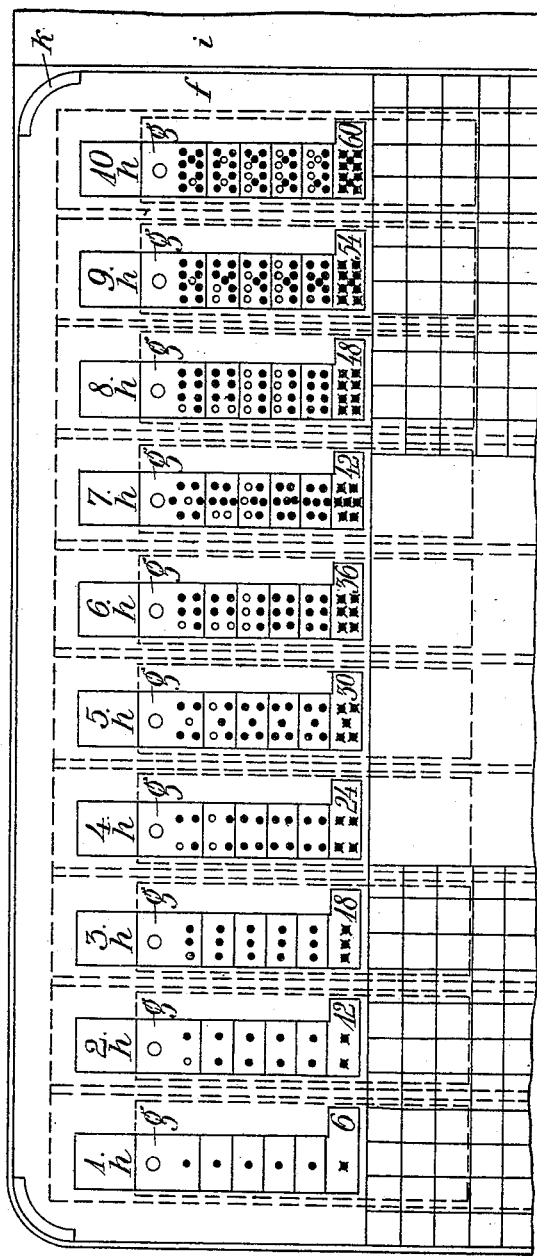
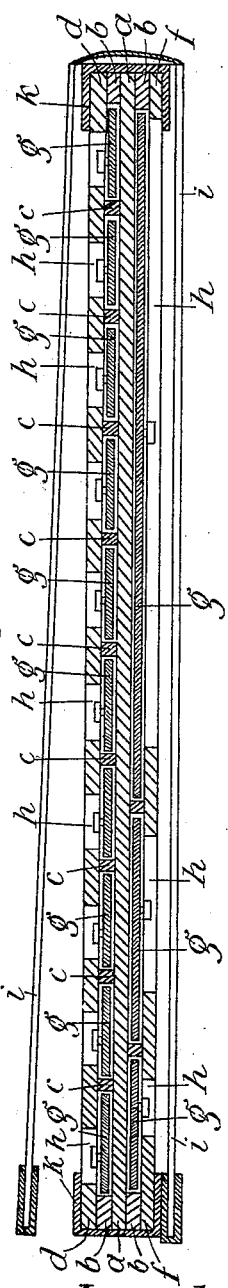
Witnesses:
Inventor:
Josef Juhász
Attorney

UNITED STATES PATENT OFFICE.

JOSEF JUHÁSZ, OF SZEMLAK, AUSTRIA-HUNGARY.

APPARATUS FOR TEACHING AND LEARNING ARITHMETIC.

No. 856,068.      Specification of Letters Patent.      Patented June 4, 1907.

Application filed May 25, 1906. Serial No. 318,745.

*To all whom it may concern:*

Be it known that I, JOSEF JUHÁSZ, a subject of the King of Hungary, and residing at Szemlak, Austria-Hungary, have invented a new and useful Apparatus for Teaching and Learning Arithmetic, of which the following is a full, clear, and exact specification.

The present invention relates to apparatus for facilitating teaching and learning arithmetic in schools and consists of the details of construction herein after described, and particularly pointed out in the claims.

In order to render the present specification easily intelligible reference is had to the accompanying drawings in which similar letters of reference denotes similar parts throughout the several views.

Figure 1 is a plan view of one side of the apparatus, Fig. 2 is a longitudinal section through Fig. 3, and Fig. 3 a part plan view of the opposite side of the device.

The device consists of a table formed of cardboard, wood or any other suitable material, the central or base plate $a$ carrying the edge pieces $b$ and the partition strips $c$ forming a series of guideways at each side of the said plate $a$, in which a series of slides $g$ are adapted to slide up and down beneath the outer plates $d$ and $f$. These latter plates are provided with suitable recesses $h$ as herein after described, and the whole table may be provided with covers $i$ and strengthening plates $k$ or the like at the corners. In a school each child is provided with one of these calculating apparatuses.

Referring first to the side of the table represented in Fig. 1. Here we have three recesses $h$ the right hand one for units, the central one for tens and the left hand one for hundreds. Each slide $g$ is divided into ten spaces from the top to the bottom and in each space of the unit slide there is marked one spot or circle and the corresponding number 0 to 9 both in Arabian and Roman characters, such figures being visible one at the time in the lower right hand enlargement of the recess $h$. Thus when the unit slide $h$ is shifted to show the figure 6 in the corner at the bottom, six spots will be visible in the remaining part of the recess. When the tens slide is adjusted to show six, sixty spots will be visible on the visible part of the slide and when the hundreds slide is similarly adjusted, it will show 600 spots on the visible part of the slide and so on for each figure. On the tens and hundreds slides the spots may be partly black and partly circles, as indicated, for the purpose of teaching addition and subtraction. Thus in the space "1" one spot may be light and the rest dark indicating that 9 and 1 are ten or nine from ten leaves one and in the second space two spots may be light and so on throughout, as also in the hundreds space. As will be readily understood this table may be used in a variety of ways for teaching addition and subtraction, as also for explaining the relative values of the figures in their position in the tens, hundreds and so on.

The side of the apparatus represented in Fig. 3 is for facilitating the teaching of multiplication and division. Ten recesses $h$ are provided numbered 1 to 10 and each having a lower right hand extension and ten slides $g$ are mounted to slide one in each recess. Each slide is divided into ten spaces from top to bottom six of which are visible in Fig. 3 the others being beneath the covering, and each space of the first slide contains one spot and the consecutive number from 1 to 10 which appears in the lateral lower extension of the recess. Thus each spot is equal to one on the first slide. On the second slide each space contains two spots and the consecutive multiple of the same. If six spaces are visible each having two spots thereon the number 12 will appear in the enlarged part of the recess at the lower right hand end of the same and so on. Thus for instance for multiplication 6 times 6, the slide No 6 will be pushed up six spaces and the number 36 will appear in the lower corner. If for instance any number is to be divided by 6, the slide No 6 will be pushed up until the number next below the required number is shown and the number of spaces will represent the quotient. Thus supposing 36 is the dividend and 6 the divisor, then the slide number 6 will be pushed up until 36 appears and the quotient will be six spaces or 6. If 37 is to be divided by six, it will first be found that 37 is not on the slide No 6 and therefore the next number lower must be taken viz. 36, this will show that 6 will go 6 times in 37 and 37 − 36 leaves 1 over. From the foregoing description it will be readily understood how the apparatus is to be utilized in schools or elsewhere for purposes of teaching. The lower part of both sides of the table may be ruled and used for making notes.

The spots on the various slides 1 to 10 may be shown in light and dark, thus for instance on No 5 in the top space one spot may be light and four dark showing that 1 subtracted from 5 leaves 4 and on the next space two spots may be light and three dark showing that two subtracted from 5 leaves 3. Or these distinctions may be utilized for purposes of addition, as will be readily understood.

I claim as my invention:—

1. In a device for facilitating the teaching of arithmetic, the combination of a frame having slides therein, each slide being divided into ten partitions from top to bottom and having numerals arranged down the side thereof: a plate covering said slide, and having recesses therein with lateral extensions, in which the numeral indicating the number of spots visible in the whole recess becomes visible when the slide is adjusted to any desired position.

2. In a device for facilitating the teaching of arithmetic, the combination of a frame having a top plate with recesses therein, the latter having lateral enlargements, a series of slides having ten spaces from top to bottom, spots in said spaces to indicate tens, hundreds and units and figures adjacent each space to appear in the lateral enlargement and indicate the number of spots visible in each recess.

3. In a device of the kind specified, the combination of a frame having outer plates with recesses therein each having a lower lateral extension, a series of slides mounted behind said recesses and guided in said frame, a series of spots on said slides, and figures on the said slides to indicate the number of spots and multiples of said spots visible in the said recess.

In testimony whereof I affix my signature in the presence of two witnesses.

JÒSEF JUHÁSZ.

Witnesses:
PÁSZTOR MARCELL,
F. E. MALLETT.